(12) United States Patent
Conrad

(10) Patent No.: US 7,575,372 B2
(45) Date of Patent: Aug. 18, 2009

(54) DEVICE FOR CONTACTLESS MEASUREMENT OF ROTOR TEMPERATURES

(75) Inventor: Armin Conrad, Herborn (DE)

(73) Assignee: Pfeiffer Vacuum GmbH, Asslar (DE)

( * ) Notice: Subject to any disclaimer, the term of this patent is extended or adjusted under 35 U.S.C. 154(b) by 147 days.

(21) Appl. No.: 11/601,016

(22) Filed: Nov. 16, 2006

(65) Prior Publication Data

US 2007/0127551 A1    Jun. 7, 2007

(30) Foreign Application Priority Data

Dec. 2, 2005    (DE)    ........................ 10 2005 057 641

(51) Int. Cl.
 *G01K 7/38* (2006.01)
 *G01K 7/00* (2006.01)
(52) U.S. Cl. .................... 374/163; 374/176; 374/E7.04; 374/E13.01
(58) Field of Classification Search ................ 374/163, 374/166, 176, 177, 153, E7.039, E7.04, E13.01; 324/164
See application file for complete search history.

(56) References Cited

U.S. PATENT DOCUMENTS

| | | | | |
|---|---|---|---|---|
| 3,391,576 A | * | 7/1968 | Takami et al. ............... | 374/154 |
| 5,418,451 A | * | 5/1995 | Maass et al. .............. | 324/158.1 |
| 5,907,202 A | * | 5/1999 | Muraji ........................ | 310/36 |
| 6,074,088 A | | 6/2000 | Oberschmid et al. | |
| 6,346,810 B2 | * | 2/2002 | Cho et al. ................. | 324/244.1 |
| 6,424,148 B1 | * | 7/2002 | Burns ..................... | 324/207.25 |
| 2001/0007423 A1 | * | 7/2001 | Cho et al. ................. | 324/244.1 |
| 2003/0185272 A1 | | 10/2003 | Miwata et al. | |
| 2005/0127902 A1 | * | 6/2005 | Sogge et al. ............. | 324/207.2 |

FOREIGN PATENT DOCUMENTS

| | | |
|---|---|---|
| DE | 0946092 | 7/1956 |
| DE | 3416340 | 11/1985 |
| DE | 4309018 | 9/1994 |
| DE | 9616258 | 4/2000 |

* cited by examiner

*Primary Examiner*—Patrick J Assouad
*Assistant Examiner*—Bret Adams
(74) *Attorney, Agent, or Firm*—Abelman, Frayne & Schwab

(57) ABSTRACT

A device for contactless measurement of a rotor temperature includes a magnet supported on the rotor, electric coils which are arranged at the stator with which the rotor cooperates, and an electronic unit for measuring a voltage induced in the coil and including a component that converts the measured voltage into a temperature-proportional signal.

5 Claims, 4 Drawing Sheets

DEVICE FOR CONTACTLESS MEASUREMENT OF ROTOR TEMPERATURES

BACKGROUND OF THE INVENTION

1. Field of the Invention

The present invention relates to a device for contactless measurement of rotor temperatures and including a magnet provided on the rotor and an electrical coil arranged on a stator with which the rotor cooperates, and electronic means for measuring a voltage signal applied to the coil.

2. Description of the Prior Art

The measurement of temperatures of moving objects is a very common problem encountered in technology. When the objects are rotors rotating at very high speeds, only contactless measurement methods are considered. Additional boundary conditions further limit the applicability of known measuring methods. One such boundary condition can be operation under vacuum, for example. High-speed rotating mechanical vacuum pumps (e.g., turbomolecular pumps) and centrifuges can be taken as representative for many applications. The importance of temperature measurement and monitoring becomes particularly clear when considering the example of turbomolecular pumps in which specific rotor temperatures may not be exceeded for safe operation of the rotor. An exact and reproducible temperature monitoring is indispensable for this purpose.

In many areas of technology, pyrometers are used for contactless temperature measurement. These pyrometers measure the radiation coming from the rotor as a measure of its temperature. An example for an arrangement of this kind is shown in EP 1 348 940 A2. The radiation sensed by sensors depends not only on the temperature but also to a great extent on the surface condition of the rotor. Temperature measurements may be corrupted when pumping vaporous media particularly in processing technology, in that the surface of a pump rotor is subject to changes caused by condensation, deposit of solid particles, or chemical reactions. Further, expensive compensating electronics are required because of the dependency of the readings on the ambient temperature and housing temperature. The sometimes high sensitivity to high-energy ionized radiation limits the range of uses.

DE-OS 43 09 018 describes an arrangement for contactless measurement of rotor temperatures which uses ferromagnetic materials. These ferromagnetic materials are attached to the rotor of the arrangement and, along with additional components at the stator, form a magnetic circuit. Its characteristics change suddenly when the Curie temperature of the ferromagnet is exceeded. With this arrangement, it is only possible to determine that the Curie temperature has been exceeded. Several temperatures can be determined only by using several ferromagnets with different Curie temperatures. The difficulty arising in the use of an arrangement of this kind on a larger scale consists in procuring ferromagnetic materials with a reproducible Curie temperature. Further, it is possible to take measurements over necessary temperature ranges only by devoting considerable resources with the resulting high costs.

SUMMARY OF THE INVENTION

It is the object of the present invention to provide a device for measuring rotor temperatures in a noncontacting manner which delivers accurate, and reproducible results by simple means and which avoids the drawbacks discussed above.

This and other objects of the present invention, which will become apparent hereinafter, are achieved by providing a temperature measuring device in which electronic measuring means measures the voltage that is induced in the electrical coil provided on the stator, and converts the measured voltage in a temperature proportional signal.

In contrast to the prior art, the device according to the invention makes it possible to measure the temperature of the rotor over a broad range, and only a single device is needed for this purpose. The temperature measurement is not dependent on the Curie temperature of the ferromagnet, which facilitates production of the device because the requirement for a constant and exact Curie temperature for a large number of ferromagnets is eliminated. Further, the temperature measurement is not dependent upon the surface quality of the rotor and stator so that deposits are of practically no significance.

In a further development of the invention, the temperature-proportional signal is a voltage, which simplifies the further processing of the signal in an electronic unit.

According to another embodiment of the invention, the operating temperature of the magnet lies within the temperature range in which the dependency of the magnetization on temperature is linear and reversible. Therefore, the measurement can be repeated as often as desired in practice. It is possible to continue the determination of temperature even after a temperature threshold has been reached. Accuracy is increased and conversion of the signal voltage to a temperature-proportional signal is facilitated.

According to a further development of the invention, a fixed gap is provided between two coils between which the ferromagnet moves on its circular path in rotating around the rotor axis. This measure increases the accuracy of the measurement because it prevents a change in the gap between the magnet and the measurement coil. This change is generally caused by the expansion of the rotor material as the temperature increases.

According to yet another embodiment of the invention, a plurality of pairs of coils are arranged over the circular path so that the measuring accuracy can be further increased. These pairs of coils are coupled by a series connection or parallel connection.

According to a still further embodiment of the present invention, the device is based, in an advantageous manner, on already existing components for carrying out temperature measurements, i.e., as a magnet for temperature measurement, a drive magnet is used. The expenditure on components is considerably reduced in an advantageous manner by using the motor magnet and motor coils.

The advantages of the device according to the invention are especially pronounced when it is used in a turbomolecular pump with a high-speed rotor because of the arrangement of few components on the rotor. This makes it possible to place them at different locations on the rotor and, therefore, allows greater freedom in the choice of measurement location. The embodiment with a constant gap is likewise advantageous because it eliminates the influence of heat-induced length changes. The latter occur precisely in turbomolecular pumps because the rotor works mostly in atmosphere-free space and, therefore, has only poor heat dissipation. Further, the lack of sensitivity to deposits of particles on the surface of the device in a turbomolecular pump is particularly advantageous because these pumps are often used in processing technology.

The novel features of the present invention, which are considered as characteristic for the invention, are set forth in the appended claims. The invention itself, however, both as to its construction and its mode of operation, together with additional advantages and objects thereof, will be best under-

DETAILED DESCRIPTION OF THE PREFERRED EMBODIMENTS

Figure 1:
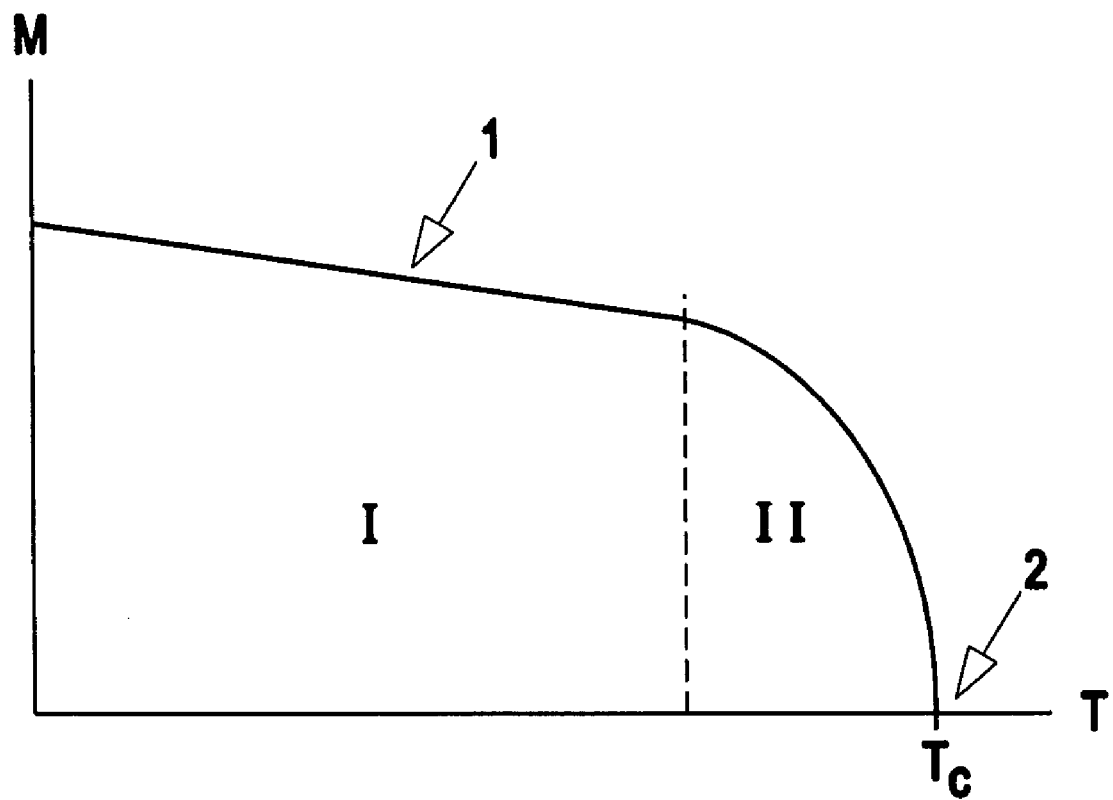
FIG. 1 a diagram showing the temperature dependency of the magnetization of a magnet.

FIG. 1 shows a diagram illustrating the dependency of the magnetic polarization M (magnetization) of a permanent magnet on temperature T, in the present case, the rotor temperature. This temperature dependency follows curve 1. As the temperature increases, the magnetic polarization decreases. In area I, this decrease is linear within a very close approximation and, further, is reversible. In area II, it drops off increasingly sharply until, finally, there is no further polarization. This non-polarization point 2 occurs at the material-specific Curie temperature TC. The magnets of the device according to the present invention are advantageously used in area I.

Figure 2:
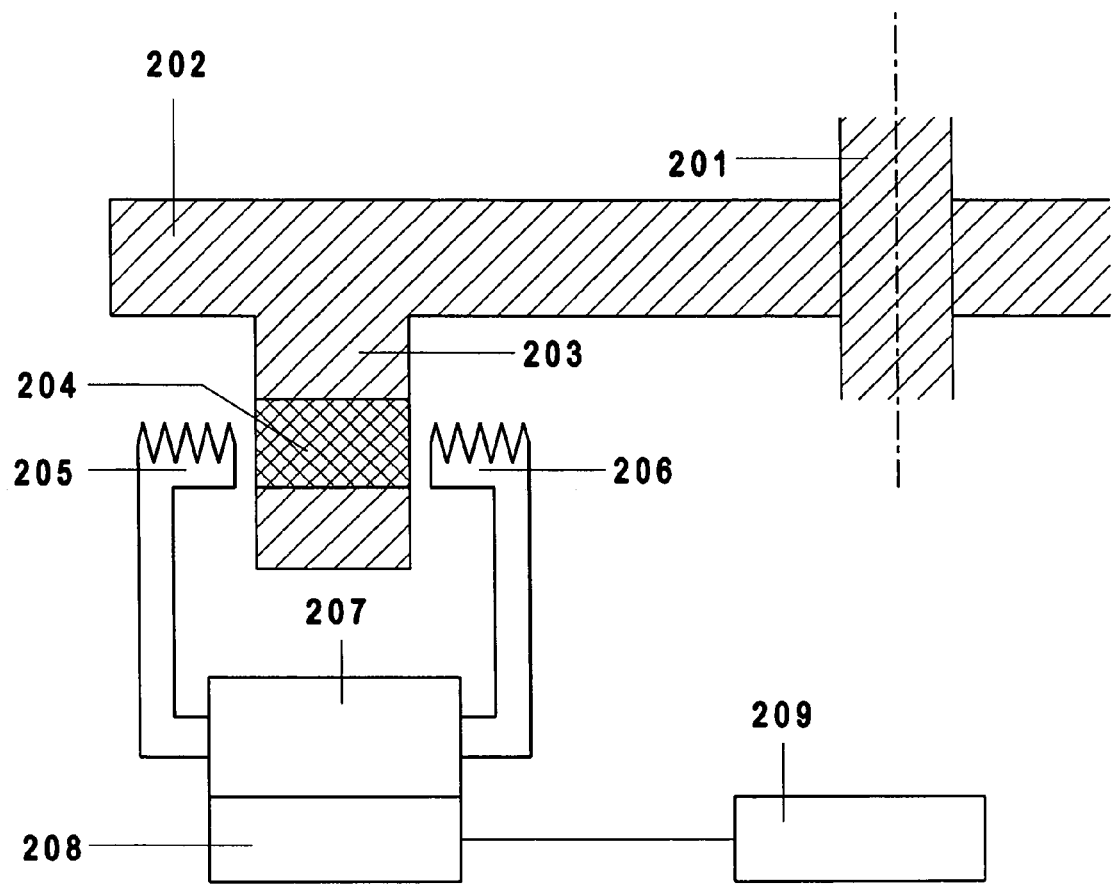
FIG. 2 a cross-sectional axial view of a first embodiment of a measuring device according to the present invention.

A first suitable device according to the present invention for measuring temperature is shown in FIG. 2. The rotor is mounted on a shaft 201 and has a disk-shaped part 202. A ring 203, in which a ferromagnet 204 is arranged at a point on the circumference, is fitted to this disk-shaped part 202. Alternatively, a protuberance at which the ferromagnet is arranged can also be provided instead of a ring. When the rotor rotates, it travels on a path around the rotor axis. Along this rotational path, it passes the coil 205 in which it induces a voltage at the moment it passes the coil 205. This voltage is measured by the voltage measuring electronics 207 and is converted into a temperature-proportional signal by a part 208 of the electronics. This signal is then communicated, e.g., to a microcontroller 209, for further processing.

This first measuring device can be improved by arranging a second coil 206 at a fixed distance from the first coil 205 in such a way that the magnet 204 on its circular path passes the intermediate space between the coils 205, 206. This noticeably improves the accuracy: The rotor, particularly the disk 202, expands when heated. This increases the distance of the ferromagnet 204 from the axis of rotation and it accordingly moves past the coil 205 at a closer distance, and the air gap decreases. Now, if a second coil 206 is arranged as shown, the distance from the coil 205 decreases, but the distance from the coil 206 increases so that the air gap remains constant on the whole. Therefore, the induced signal does not depend on the rotor displacement disturbance variable.

Figure 3:
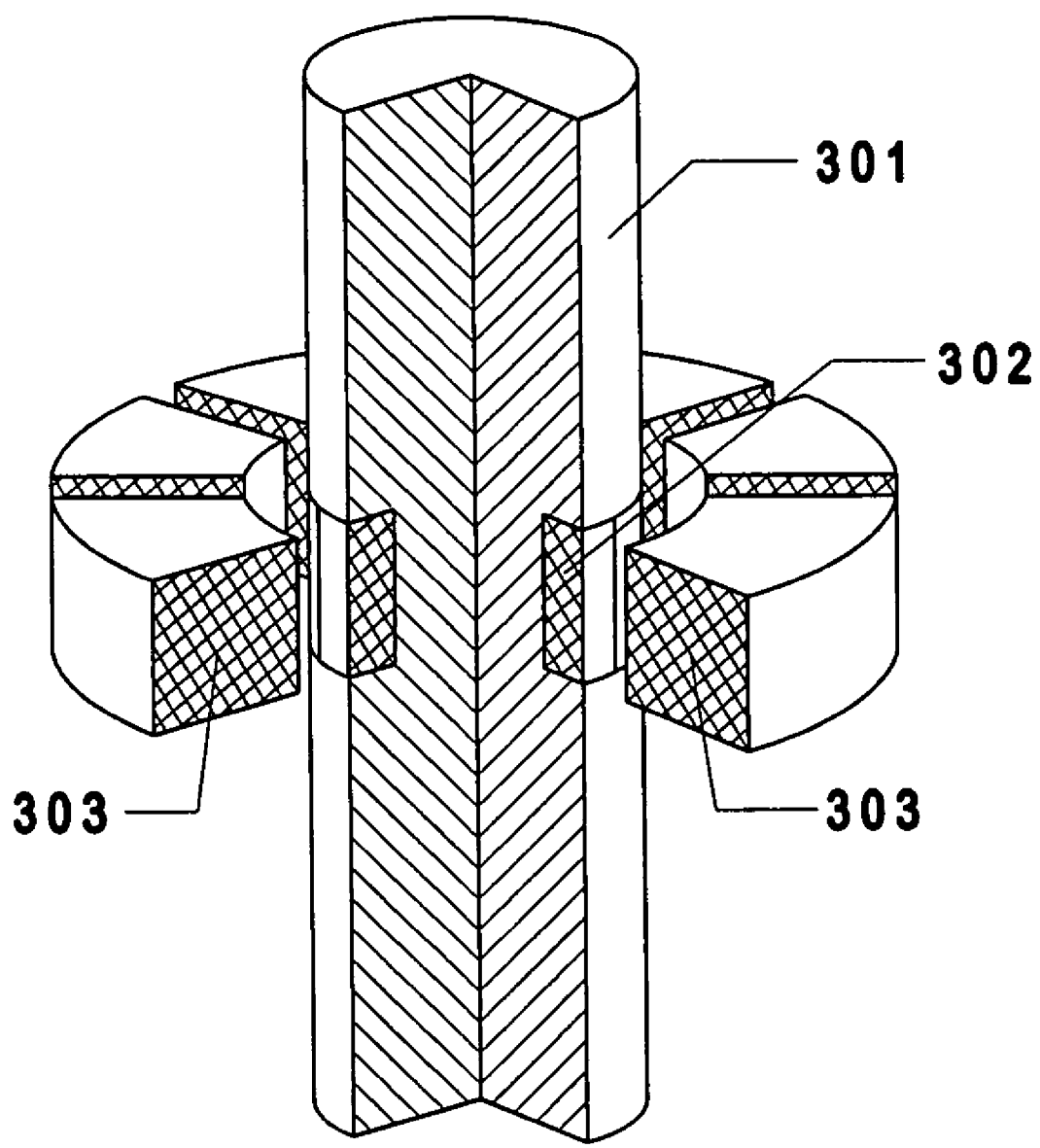
FIG. 3 a cross-sectional view illustrating an advantageous embodiment of the invention which makes use of the drive arrangement for a shaft, for example, in a turbomolecular pump.
Figure 4:
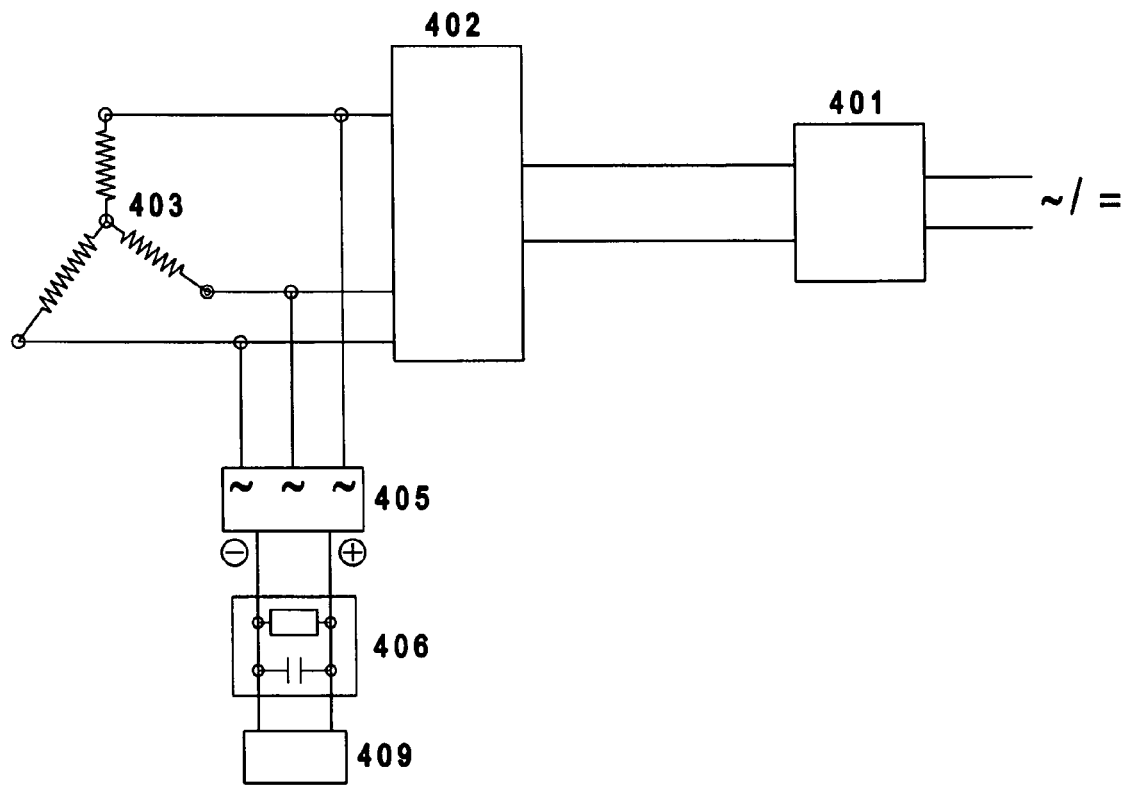
FIG. 4 a schematic diaphragm of the electric circuit for the arrangement according to FIG. 3.

A second suitable measuring device is shown in FIGS. 3 and 4. FIG. 3 shows the shaft 301 of a rotor. Permanent magnets 302 are fastened to it. Coils 303 generate a magnetic field which sets the shaft in rotation when suitable current is applied to the coils. FIG. 4 shows an arrangement that operates in this way. Three coils of the drive are designated by 403. Current is applied to these coils in a manner known per se by drive electronics 402, where, at any one time, one of the coils 403 is without current. The currentless coil can, therefore, serve as a detector coil for the voltage measuring device 405. This voltage is subsequently rectified by a rectifier circuit 406 so that a DC voltage is communicated to a microcontroller 409 as a temperature signal for further processing. Power supply electronics 401 are used to supply electrical energy to the drive electronics 402.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A device for measuring temperature of a rotatable rotor (201, 202) that cooperates with a stator, the device comprising an electric coil (205, 206) arranged on the stator; a permanent magnet (204, 302) mounted on the rotor (201, 202) for rotation therewith for inducing voltage in the electric coil (205, 206) upon passing the electric coil (205, 206a); and electronic means for measuring the voltage (207, 405) induced in the coil (205, 206) by the permanent magnet (204) and including means for converting the voltage into a temperature-proportional signal, wherein the operating temperature of the magnet (204) lies within the temperature range in which a dependency of magnetization on temperature is linear and reversible.

2. A device according claim 1, where the temperature proportional signal is a voltage.

3. A device according claim 1, where the magnet is a drive magnet (303, 403).

4. A device according claim 1, further comprising another coil (205, 206) at the stator, and wherein the magnet (204) is arranged in such a way that it passes an intermediate space between the two coils (205, 206) on its circular path resulting from rotation of the rotor (201, 202).

5. A device according to claim 4, wherein plurality of pairs of coils is arranged along the circular path of the magnet (204).

* * * * *